United States Patent Office 2,709,666
Patented May 31, 1955

2,709,666

METHOD OF LOCALLY REMOVING THE INSULATION LAYER OF ENAMELLED WIRE

Bernardus Willebrordus Speekman, Venlo, Netherlands, assignor to Hartford National Bank and Trust Company, Hartford, Conn., as trustee No Drawing. Application April 19, 1951,
Serial No. 221,933

Claims priority, application Netherlands
September 4, 1950

4 Claims. (Cl. 134—6)

When manufacturing electrical apparatus and their component members, for which insulated wire is used, the insulation is required to be locally removed for the establishment of connections. A number of methods are known for this purpose. Thus, for example, the insulation may be removed mechanically, for example by scouring or scratching, tools constructed particularly for this purpose being frequently used. As an alternative, the insulation is removed by burning off in a flame or else by immersion in solder heated to about 500° C. As a further alternative, use may be made of substances dissolving the insulating layer or chemically attacking it.

When using the above indicated known methods for removing the insulation, difficulty arises with enameled wire by reason of the excellent mechanical properties and chemical resistance of the insulating layer. Particularly with very thin wire the probability of harmful burning of the core wire when burning off in a flame is great. Burning off in heated solder is always attended by the formation of harmful oxide layers and by much loss of tin. Mechanical removal of insulation from thin wire is open to objection in view of the low mechanical resistance. Finally, dissolving and chemically attacking the insulation has a limitation in that when using the means commercially available for this purpose this operation takes much time. In this latter method pernicious vapors are often formed and during the reaction splashes may occur. In addition, the residues of the chemicals used, which may result in corrosion of the metal, are required to be removed very thoroughly.

The said limitations of the known methods occur with wire enamelled with the use of synthetic enamel-lacquers which, in view of their most satisfactory mechanical, chemical and electrical properties, are frequently used, such as polyvinylacetal lacquer and nylon lacquer, to an even more marked extent than with the conventional enamel-wire, which is insulated with the use of an enamel-lacquer comprising a base of drying oil.

The invention relates to a method of locally removing the insulation of enamelled wire, more particularly wire enamelled with the use of a synthetic lacquer, whereby the object aimed at by the invention is obtained in a simple and rapid manner.

According to the invention, the insulating layer, after being treated with an organic sulphonic acid, more particularly an aromatic sulphonic acid, is carbonized at a temperature of at least 200° C., preferably 300° C. The carbonization takes only a few seconds.

The carbonized layer is readily wiped off the metal surface, which during this operation is not attacked. A further particular advantage is that residues of the chemicals used which are liable to subsequently bring about corrosion, are not left at the areas treated.

The sulphonic acid is used in the form of a solution. The solution may be admixed with a wetting agent. Since, however, many of the conventional wetting agents are decomposed by sulphonic acids the admixture may be objectionable in view of the decreased keeping qualities of the solutions. It is therefore preferred to use the sulphonic acid dissolved in mixtures of alcohol and water, efficacious wetting being thus ensured.

Satisfactory results are obtained, for example, with a 30% solution of toluene sulphonic acid or naphthalene sulphonic acid in water which has been admixed with 2% polyoxyethylene-sorbitan-monolaurate as the wetting agent. However, a solution of sulphonic acid in dilute alcohol, for example a solution comprising 30% toluene sulphonic acid, 35% ethyl alcohol and 35% water is more durable.

For carrying out the method according to the invention for example, one end of a copper wire $250\mu$ in thickness which is insulated by a lacquer comprising a base of polyvinylformal and enamelled at 300° C., is immersed in the last-mentioned mixture, whereupon heating is effected at 300° C. This heating may be effected by bringing the wire-end in engagement with a heated metal plate or, for example, with the use of a pair of tongs having heated jaws. The slightly coherent, carbonized layer which is thus formed is then wiped off and the resultant, perfectly bare and readily solderable metal surface does not tend to corrode.

What I claim is:

1. A method of locally removing the insulating layer of wire enamelled by means of a synthetic enamel-lacquer comprising the steps of immersing said wire in a bath of an aromatic sulphonic acid, heating said insulating layer to a temperature of at least 200° C. in order to form a carbonized layer on said wire, and wiping off said carbonized layer, thus leaving the exposed metal surface of said wire.

2. A method of locally removing the insulating layer of wire enamelled by means of a synthetic enamel-lacquer comprising the steps of immersing said wire in an aqueous solution of an aromatic sulphonic acid mixed with a wetting agent, heating said insulating layer to a temperature of at least 200° C. in order to form a carbonized layer on said wire, and wiping off said carbonized layer, thus leaving the exposed metal surface of said wire.

3. A method of locally removing the insulating layer of wire enamelled by means of a synthetic enamel-lacquer comprising the steps of immersing said wire in a solution of an aromatic sulphonic acid in dilute alcohol, heating said insulating layer to a temperature of at least 200° C. in order to form a carbonized layer on said wire, and wiping off said carbonized layer, thus leaving the exposed metal surface of said wire.

4. A method of locally removing the insulating layer of wire enamelled by means of a synthetic enamel-lacquer comprising the steps of immersing said wire in a bath of toluene sulphonic acid, heating said insulating layer to a temperature of at least 200° C. in order to form a carbonized layer on said wire, and wiping off said carbonized layer, thus leaving the exposed metal surface of said wire.

References Cited in the file of this patent

UNITED STATES PATENTS

| Number | Name | Date |
|---|---|---|
| 244,146 | Roberts | July 12, 1881 |
| 2,083,014 | Freeman | June 8, 1937 |
| 2,208,294 | Hempel | July 16, 1940 |
| 2,360,509 | Morgan | Oct. 17, 1944 |
| 2,432,868 | Earl et al. | Dec. 16, 1947 |
| 2,495,729 | James | Jan. 31, 1950 |